(12) United States Patent
Smith et al.

(10) Patent No.: US 9,027,418 B2
(45) Date of Patent: May 12, 2015

(54) MAGNETIC FLOWMETER

(71) Applicant: Rosemount Inc., Chanhassen, MN (US)

(72) Inventors: Joseph Alan Smith, Minneapolis, MN (US); Steven Bruce Rogers, Minnetonka, MN (US); Michael John Mayer, Waconia, MN (US); Nelson Mauricio Morales, Lakeville, MN (US); Brian Scott Junk, Plymouth, MN (US)

(73) Assignee: Rosemount Inc., Chanhassen, MN (US)

( * ) Notice: Subject to any disclaimer, the term of this patent is extended or adjusted under 35 U.S.C. 154(b) by 159 days.

(21) Appl. No.: 13/630,600

(22) Filed: Sep. 28, 2012

(65) Prior Publication Data

US 2014/0090483 A1    Apr. 3, 2014

(51) Int. Cl.
*G01N 1/22* (2006.01)
*G01F 1/58* (2006.01)

(52) U.S. Cl.
CPC ............... *G01F 1/586* (2013.01); *G01F 1/588* (2013.01)

(58) Field of Classification Search
USPC ...................................................... 73/863.11
See application file for complete search history.

(56) References Cited

U.S. PATENT DOCUMENTS

| | | | |
|---|---|---|---|
| 3,745,824 A | 7/1973 | Mannherz et al. | |
| 3,924,466 A * | 12/1975 | Medlar | 73/861.12 |
| 3,981,190 A | 9/1976 | Vidmantas | 73/194 EM |
| 4,098,118 A | 7/1978 | Schmoock | 73/194 EM |
| 4,253,340 A | 3/1981 | Schmoock | 73/861.12 |
| 4,459,858 A | 7/1984 | Marsh | 73/861.12 |
| 4,785,672 A | 11/1988 | Picone | 73/861.12 |
| 5,349,872 A * | 9/1994 | Kalotay et al. | 73/861.355 |
| 6,877,386 B2 | 4/2005 | Needham et al. | 73/861.11 |
| 7,621,188 B2 | 11/2009 | Lincoln et al. | 73/861.12 |
| 7,650,797 B2 | 1/2010 | Nielsen | 73/861.12 |
| 7,665,368 B2 | 2/2010 | Lincoln et al. | 73/861.12 |

(Continued)

FOREIGN PATENT DOCUMENTS

| | | |
|---|---|---|
| DE | 3329689 A1 | 3/1984 |
| DE | 41 14 537 | 11/1992 |

(Continued)

OTHER PUBLICATIONS

Sitrans F M MAG 8000 / MAG 8000 CT/ MAG 8000 Irrigator; Water Flow Meter. Siemens. Retrieved Mar. 21, 2013 from www.automation.siemens.com/w1/index.aspx?nr=18644.

(Continued)

*Primary Examiner* — Lisa Caputo
*Assistant Examiner* — Jamel Williams
(74) *Attorney, Agent, or Firm* — Westman, Champlin & Koehler, P.A.

(57) ABSTRACT

A magnetic flowmeter for sensing process fluid flow is provided. The flowmeter includes a tube configured to receive the process fluid flow therethrough. A plurality of electrodes is disposed to contact process fluid. At least one electromagnetic coil is disposed proximate the tube. Flowmeter electronics are configured to drive a current through at least one electromagnetic coil and to sense a signal developed across a plurality of electrodes disposed to contact process fluid. A flexible circuit module is disposed proximate the tube, and has at least one flexible circuit containing a plurality of electrical traces electrically coupled to the flowmeter electronics. The at least one electromagnetic coil includes a first coil in the flexible circuit module that is coupled to the electrical traces.

41 Claims, 6 Drawing Sheets

(56) References Cited

U.S. PATENT DOCUMENTS

| | | | |
|---|---|---|---|
| 7,673,523 B2 | 3/2010 | Nielsen | 73/861.12 |
| 7,930,816 B2 | 4/2011 | Lincoln et al. | 29/602.1 |
| 8,286,502 B2 * | 10/2012 | Pelayo | 73/861.12 |
| 8,307,719 B2 * | 11/2012 | Magliocca et al. | 73/861.11 |
| 8,561,480 B2 * | 10/2013 | Lawrence | 73/861.42 |
| 2009/0188327 A1 * | 7/2009 | Shanahan et al. | 73/861.08 |
| 2013/0305838 A1 * | 11/2013 | Mikolichek et al. | 73/861.08 |
| 2014/0083199 A1 | 3/2014 | Rogers | |
| 2014/0083200 A1 | 3/2014 | Rogers et al. | |

FOREIGN PATENT DOCUMENTS

| | | | | |
|---|---|---|---|---|
| DE | 19708857 | | 7/1998 | |
| DE | 10 2005 060 208 | | 6/2007 | |
| EP | 0 682 233 | | 11/1995 | |
| GB | 2403016 | | 12/2004 | |
| GB | 2403016 A | * | 12/2004 | G01F 1/58 |
| JP | 2013-007664 | | 1/2013 | |

OTHER PUBLICATIONS

Sitrans F M MAG 5100 W. Overview. Siemens. Retrieved Mar. 21, 2013 from www.automation.siemens.com/w1/index.aspx?nr=18632.

International Search Report and Written Opinion of the International Searching Authority dated May 16, 2013 for International Appln. No. PCT/US2012/068949, filed Dec. 11, 2012.

Notification of Transmittal of the International Search Report and the Written Opinion of the International Searching Authority from PCT/US2014/055774, dated Dec. 3, 2014.

* cited by examiner

MAGNETIC FLOWMETER

BACKGROUND

The present invention relates to magnetic flowmeters that sense the flow of process fluid in industrial process plants. More specifically, the present invention relates to measurement of flow using a magnetic flowmeter.

Magnetic flowmeters are known in the art and typically utilize an electrically insulated flow tube that carries a flow of process fluid past an electromagnetic coil and past a pair of electrodes. The electromagnetic coil applies an electromagnetic field to the flowing process fluid. Due to Faraday's Law of electromagnetic induction, a voltage or Electromotive Force (EMF) is generated between the pair of electrodes in the fluid. This voltage is a function of the strength of the applied magnetic field and is proportional to the fluid's rate of flow.

SUMMARY

A magnetic flowmeter for sensing process fluid flow is provided. The flowmeter includes a tube configured to receive the process fluid flow therethrough. A plurality of electrodes is disposed to contact process fluid. At least one electromagnetic coil is disposed proximate the tube. Flowmeter electronics are configured to drive a current through at least one electromagnetic coil and to sense a signal developed across a plurality of electrodes disposed to contact process fluid. A flexible circuit module is disposed proximate the tube, and has at least one flexible circuit containing a plurality of electrical traces electrically coupled to the flowmeter electronics. The at least one electromagnetic coil includes a first coil in the flexible circuit module that is coupled to the electrical traces.

DETAILED DESCRIPTION

Figure 1:
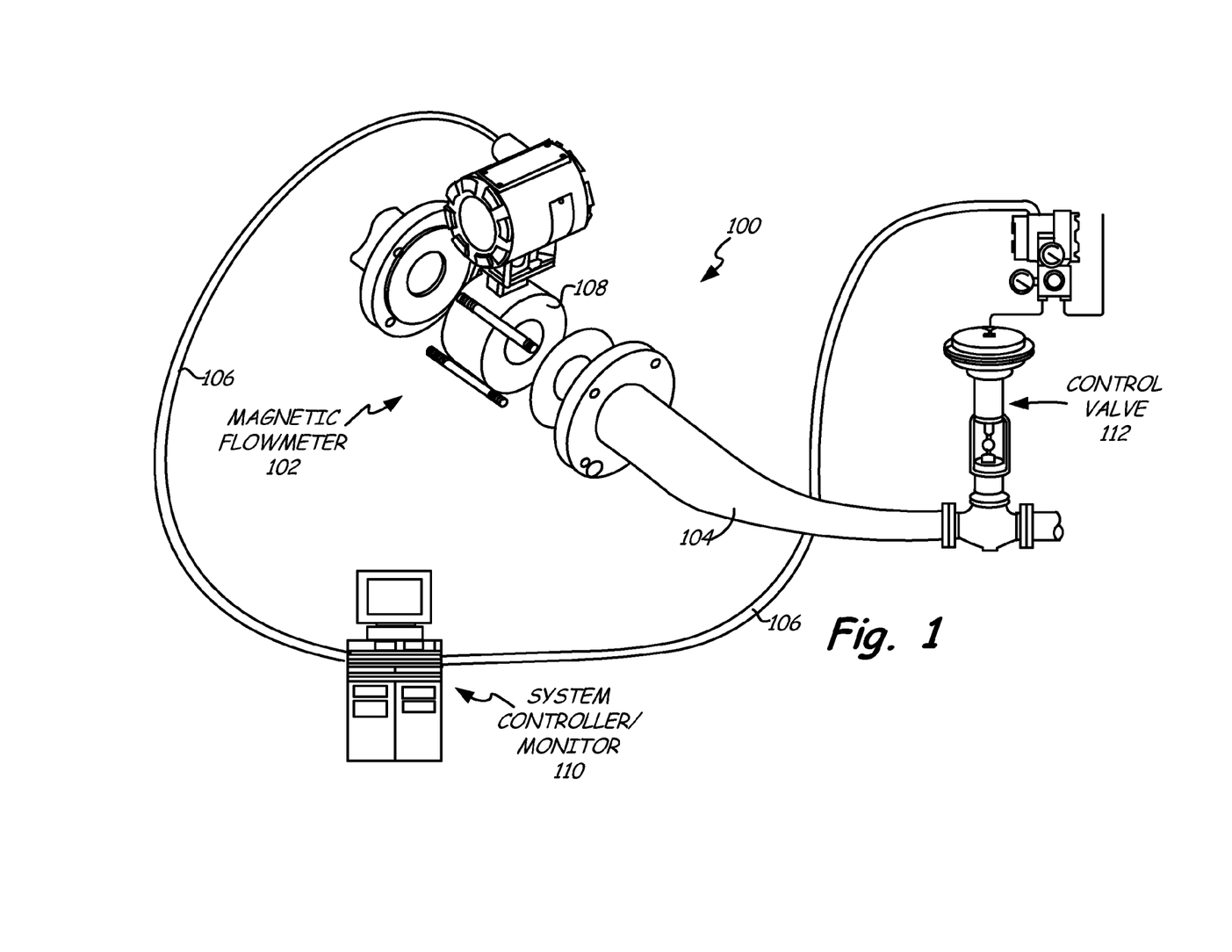
FIG. 1 is a diagram showing a process control system including a magnetic flowmeter.

FIG. 1 illustrates a typical environment 100 for magnetic flowmeter 102. Magnetic flowmeter 102 is shown coupled to process piping 104 that also couples to control valve 112. Magnetic flowmeter 102 is an example of one type of process variable transmitter which can be configured to monitor one or more process variables associated with fluids in a process plant such as slurries and liquids in chemicals, pulp, petroleum, gas, pharmaceutical, food and other fluid processing plants.

In a magnetic flowmeter, the monitored process variable relates to the velocity of process fluid through process piping and thus flow tube 108. Magnetic flowmeter 102 includes electronics housing 120 connected to flow tube 108. Magnetic flowmeter 102 outputs are configured for transmission over long distances to a controller or indicator via communication bus 106. In typical processing plants, communication bus 106 can be a 4-20 mA current loop, a FOUNDATION™ Fieldbus connection, a pulse output/frequency output, a Highway Addressable Remote Transducer (HART®) protocol communication, a wireless communication connection, such as that in accordance with IEC 62591, Ethernet, or a fiber optic connection to a controller such as system controller/monitor 110 or other suitable device. System controller 110 is programmed as a process monitor, to display flow information for a human operator or as a process controller to control the process using control valve 112 over communication bus 106.

Figure 2:
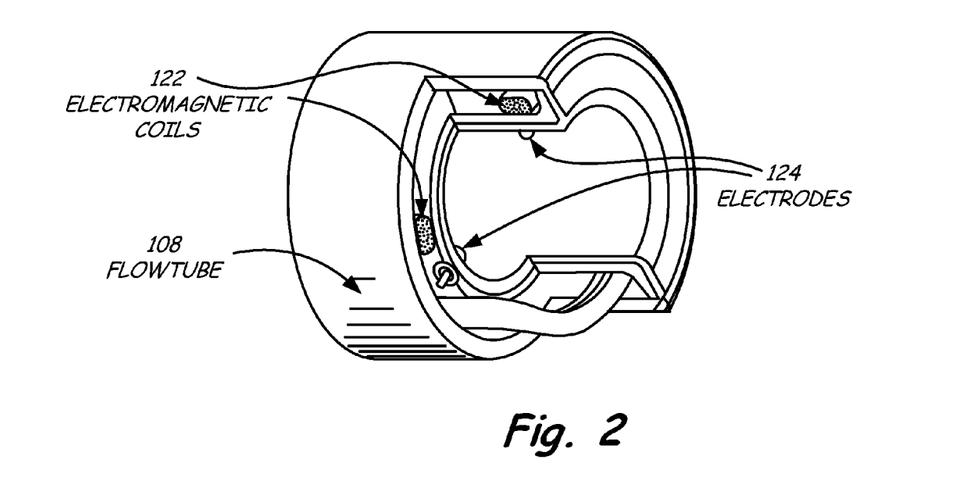
FIG. 2 is a partial cutaway view of the magnetic flowmeter of FIG. 1.

FIG. 2 is a perspective cutaway view of a flow tube 108 of magnetic flowmeter 102 in accordance with the prior art. Flow tube 108 includes electromagnetic coils 122 which are used to induce a magnetic field in fluid flowing through flow tube 108. Electrodes 124 in flow tube 108 are used to sense the EMF generated in the fluid due to the velocity of the flow and the applied magnetic field.

Figure 3:
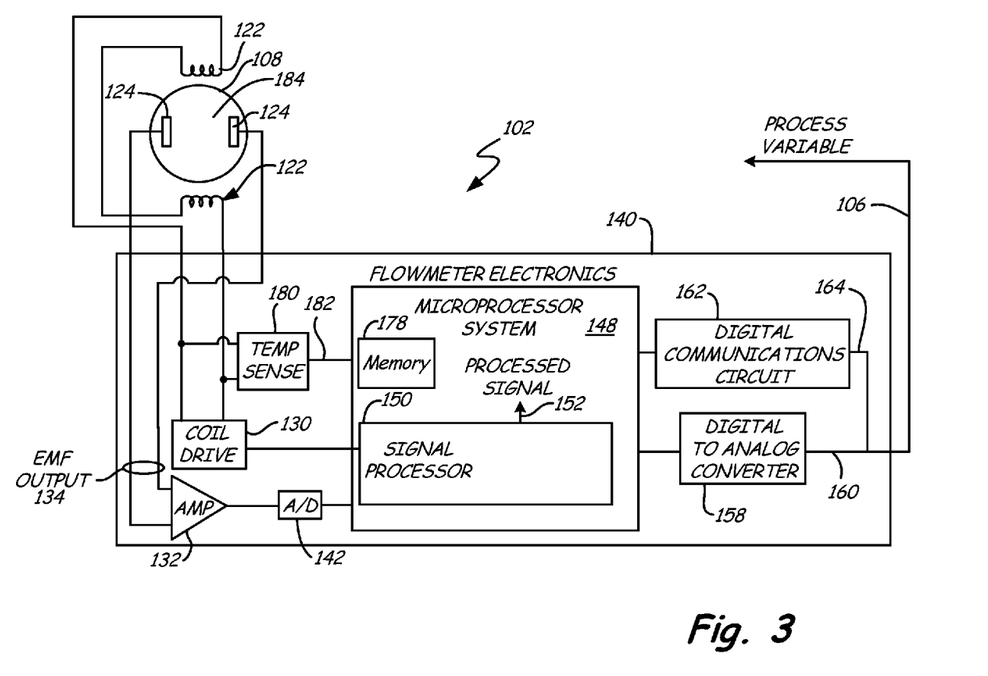
FIG. 3 is a simplified block diagram showing electrical components of a magnetic flowmeter.

FIG. 3 is a system block diagram of an embodiment showing various electrical components of a magnetic flowmeter for measuring a flow of a conductive process fluid through flow tube assembly 108. Coils 122 are configured to apply an external magnetic field in the fluid flow in response to an applied drive current from coil driver 130. Coil driver circuitry 130 provides the drive current to electromagnetic coils 122. EMF sensors (electrodes) 124 electrically couple to the fluid flow and provide an EMF signal output 134 to amplifier 132 related to an EMF generated in the fluid flow due to the applied magnetic field, and fluid velocity. Analog to digital converter 142 provides a digitized EMF signal to microprocessor system 148. A signal processor 150 is implemented in microprocessor system 148 of flow meter electronics 140 which couples to the EMF output 134 to provide an output 152 related to fluid velocity. Memory 178 can be used to store program instructions or other information as discussed below.

Microprocessor system 148 calculates velocity through flow tube 108 in accordance with a relationship between the EMF output 134 and the flow velocity as set forth in Faraday's law, which states:

$$V = \frac{E}{kBD} \qquad \text{Eq. 1}$$

Where E is the EMF output 134, V is the velocity of the fluid, D is the diameter of flow tube 108 and B is the strength of the magnetic field in the fluid. k is a constant of proportionality. A digital to analog converter 158 can be included and coupled to microprocessor system 148 to generate an analog transmitter output 160, if desired, for coupling to communication bus 106. A digital communication circuit 162 generates a digital transmitter output 164. The analog output 160 and the digital output 164 can be coupled to process controllers or monitors as desired.

The coils of many magnetic flowmeters manufactured currently are generally wire-wound and formed by hand. The coils are then secured to pipe spools using various styles of mechanical clamps. The process involves significant manual labor and is sometimes difficult to repeat. Moreover, for a number of magnetic flow meters, the electrodes rely on the flowtube wall for support. A problem can arise when the wall balloons in response to pressure at the high end of the flowtube's pressure rating. This can result in movement along critical sealing surfaces and may potentially cause leaks.

In accordance with an embodiment of the present invention, the coils and electrodes of a magnetic flowmeter are disposed on a flexible circuit module that is inserted within a flowtube. Flexible circuit module 220 (shown in FIG. 4A) includes coils and preferably electrodes in a relatively thin form factor. Generally, a flexible circuit is manufactured in accordance with known techniques that are substantially similar to printed circuit board processing. However, when a flexible circuit is complete, it is still flexible and can be incorporated into devices and structures that require at least some curvature or other deformation of the circuit. Additionally, it is also possible to wind wires directly into or onto the flexible circuit substrate during manufacture. For example, the wires for the coils may be wound instead of formed using traditional circuit patterning techniques or plating, but the finished assembly would still be considered a flexible circuit module.

Pursuant to this embodiment, the flexible circuit module can be attached or affixed to a rigid backing for ease of assembly, if desired. The rigid backing can be formed of any suitable rigid material including a metal foil or sleeve. The flexible circuit module is placed within the flowtube, and wires coupled to the flex circuit pass through a wall of the flowtube. A non-conductive liner then covers the entire flexible circuit module with the exception of the electrodes. The finished sub-assembly represents a significant improvement in terms of coil and electrode positioning and also reduces potential leak paths since the electrodes, while passing through the liner, do not pass directly through the liner and the flowtube. Additionally, embodiments of the present invention reduce part-to-part variation in comparison to current designs and will likely increase reliability of the entire flowmeter system. Further still, since the coil housing would no longer be needed, the flowtube could be made of carbon steel (which provides a magnetic return) which would result in significant cost reductions.

Figure 4A:
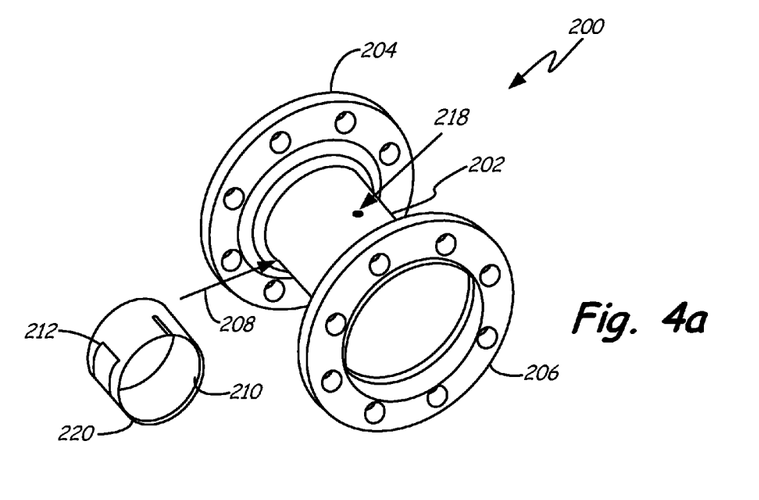
FIG. 4A is a diagrammatic perspective view of a flexible circuit module and flowtube of a magnetic flowmeter in accordance with an embodiment of the present invention.

FIG. 4A is a diagrammatic perspective view of flexible circuit module 220 and flowtube 200 of a magnetic flowmeter in accordance with an embodiment of the present invention. Flowtube 200 includes a pipe section 202 and a pair of pipe flanges 204, 206 welded to pipe section 202. Flexible circuit module 220 is illustrated next to flowtube 202 with an arrow 208 indicating that flexible circuit module 220 gets mounted within pipe section 202 of flowtube 200. Flexible circuit module 220 includes at least one, and preferably a plurality of coils 210, 212 that are configured to generate a magnetic field within flowtube 200 when current is passed through them. Coils 210, 212 can be formed in any suitable manner. For example, coils 210, 212 may be wire-wound coils that are wound using an X-Y wire winder. The wire-wound coils may then be coupled to one or more flexible circuit traces in module 220. Additionally, or alternatively, coils 210, 212 can also be formed using standard flexible circuit processing techniques or may be plated onto the flexible circuit substrate. In some embodiments, the coils and/or circuit traces of the flexible circuit module can be plated to increase their current carrying abilities and potentially achieve a thinner overall profile. In some embodiments, module 220 may be a custom-designed coil such as those available from any number of flexible circuit board suppliers.

Figure 4B:
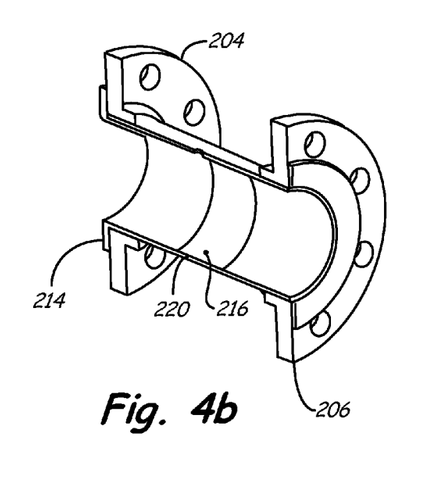
FIG. 4B is a diagrammatic cross-sectional perspective view of a flexible circuit module mounted within a flowtube of a magnetic flowmeter in accordance with an embodiment of the present invention.
Figure 4C:
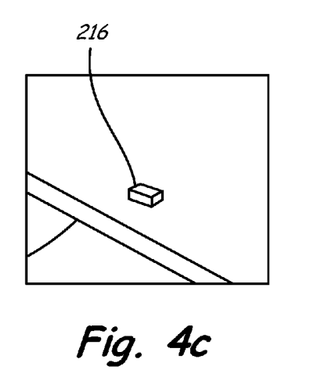
FIG. 4C is an enlarged perspective view of an electrode within a flowtube of a magnetic flowmeter in accordance with an embodiment of the present invention.

FIG. 4B is a diagrammatic cross-sectional perspective view of a flexible circuit module 220 mounted within flowtube 200 of a magnetic flowmeter in accordance with an embodiment of the present invention. FIG. 4B shows flexible circuit module 220 mounted substantially midway between flanges 204, 206 inside tube 202. Liner 214 extends from flange 204 to flange 206 covering all of module 220 except for the electrodes, of which one is shown at reference numeral 216. FIG. 4C is an enlarged perspective view of electrode 216 within flowtube 200. In embodiments where the electrodes are formed as raised tips, the metal tips are preferably brazed on the flexible circuit. However, other suitable electrical interconnection techniques can also be employed in accordance with embodiments of the present invention. Although the electrodes can be part of the flexible circuit with raised tips such that liner 214 does not cover them, the electrodes can also simply be conductive patches or regions that are left exposed by an aperture in lining 214, as long as the liner is suitably sealed to the electrodes. In either case, the electrodes are coupled to wires or other suitable conductors that exit flowtube 200 through a suitable interconnect 218, such as a glass header, located preferably at the top of flowtube 200. Another feature of the embodiment described with respect to FIGS. 4A-4C is that electrode location is entirely independent of the position of the interconnect 218. This provides greater flexibility in design and also ensures that process fluid bearing on the electrode will not leak or seep through the flowtube at the position of the electrode. Further still, since a single interconnect 218 can couple a plurality of electrical connections therethrough, the number of potential leak points is also reduced compared to designs where each electrode represents an aperture through the flowtube.

The utilization of flexible circuit module 220 also enables a new form of magnetic flowmeter. In accordance with some embodiments of the present invention, the flexible circuit module is mounted to a sleeve or casing that is inserted into the process piping. This can provide a number of additional benefits.

In order to robustly house electrodes and coils, a flowtube, such as flowtube 108 or flowtube 200 is typically formed of metal tube or pipe that is selected, and sized to be able to contain the a maximum process fluid pressure to which the flow meter will be exposed. Often, a flange is welded to each side of the tube. In fact, flow tube 108 when welded to a pair of flanges is referred to as a "weldment." The weldment of a magnetic flowmeter may be considered the chassis of the flowmeter and can very easily be the most expensive component of the flowmeter. For example, a weldment with a 3" line size accounts for approximately 45% of the entire cost of the magnetic flowmeter. As the line size grows, the weldment consumes an ever larger proportion of the total magnetic flowmeter cost. For example, a weldment for a 24" line size magnetic flowmeter accounts for 69% of the total cost of the magnetic flowmeter. Providing a magnetic flowmeter where the cost was not driven to such an extent by the cost of the weldment would represent a significant advance and improvement over prior designs.

In accordance with an embodiment of the present invention, a new type of magnetic flowmeter is provided. This new type is termed a coaxial insertion-type magnetic flowmeter because at least a portion of the magnetic flowmeter is actually inserted within process piping 104 and the inserted portion of the flow meter and process piping are coaxial. This is in contrast to prior designs, where the magnetic flowmeter includes a pair of flanges with each flange being attached to process piping 104 and where the flow tube, coils, and electrodes are disposed between the pair of flanges. Instead, the portion of the magnetic flowmeter that includes the coils and electrodes is disposed within process piping preferably downstream from the piping flanges. This obviates the need for a weldment. Embodiments of the present invention are also distinct from prior "insertion" type magnetic flow meters where the flow meter is inserted through a sidewall of the process piping, such as that shown in U.S. Pat. No. 4,459,858 to Marsh. In order to highlight this distinction, embodiments of the present invention are termed "coaxial" insertion-type magnetic flow meters.

Figure 5:
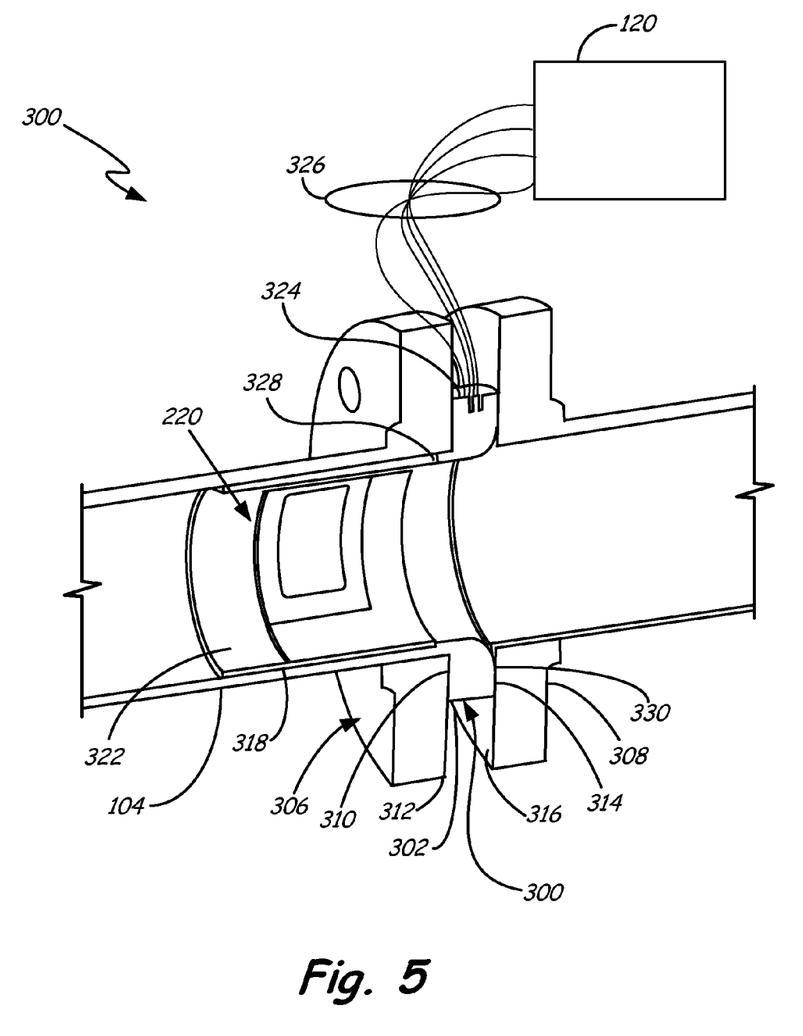
FIG. 5 is a diagrammatic perspective view of an insertion-type magnetic flowmeter installed between flanges of process piping in accordance with an embodiment of the present invention.

FIG. 5 is a diagrammatic view of a coaxial insertion-type magnetic flowmeter in accordance with an embodiment of the present invention. Flow meter 300 has a gasketed leading edge 302 that seals to the flanges 306, 308 of process piping 104. Specifically, surface 310 of leading edge 302 seals to surface 312 of flange 306 while surface 314 of leading edge 302 seals to surface 316 of flange 308. Leading edge 302 and casing 318 are preferably formed of metal to provide rigidity as well as a robust design. However, in certain light-duty applications, leading edge 302 and casing 318 may be formed of a plastic or other suitable material. Leading edge 302 preferably includes a curved or tapered upstream face 330 that is configured to smoothly condition the process fluid flow within the flow tube liner 322. Further, leading edge 302 preferably meets casing 318 at step 328, which is sized such that flow tube liner 322 is flush with, or recessed from, the end of curved surface 330.

Flexible circuit module 220 is disposed proximate casing 318 and is spaced from each of surfaces 310, 314 in the same direction (such as downstream or upstream). This is in contrast to prior designs where the coils and electrodes are disposed between a pair of flanges and thus are spaced in opposite directions from such flanges. Flexible circuit module 220 is substantially encapsulated with a suitable liner 322 that can be formed of any suitable rigid lining materials including, without limitation, polyurethane, adiprene, Ethylene Propylene Dimonomer (EPDM). Further, any material that can be molded over flexible circuit module 220 can be used. For softer liner material, such as perfluoroalkoxy (PFA) or polytetrafluoroethylene (PTFE) a metal lip can be provided on the backside (trailing edge) to better hold it in place.

The electrodes of flow meter 300 physically contact the media flowing within process piping 104. The electrodes can be part of flexible circuit module 220, having raised tips so that the liner does not cover them. Alternately, the electrodes can simply be conductive regions or patches with wires that exit through sealed portion or interconnect 324, which, in some embodiments, is formed as a glass header. However, it is also contemplated that the power and signal conductors can be formed as a part of a flexible circuit or as a separate flexible circuit that is coupled to the flexible circuit module 220.

Sealed portion 324 allows signal and power conductors 326, which are connected to the coils and electrodes, to pass therethrough, which conductors are then coupled to suitable magnetic flow meter circuitry, such as circuitry 140 (shown in FIG. 3) disposed within housing 120. In some embodiments, housing 120 may be mounted, or otherwise affixed, to gasketed leading edge 302 to form a unitary, coaxial, insertion-type magnetic flow meter.

Figure 6:
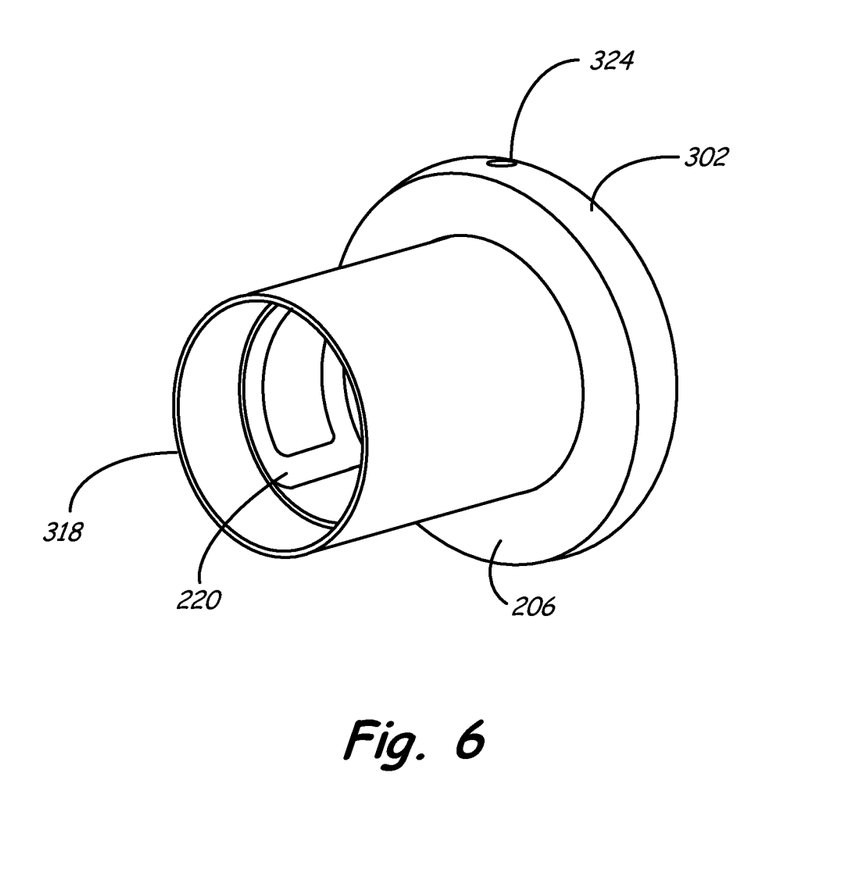
FIG. 6 is a diagrammatic perspective view of an insertion-type magnetic flowmeter in accordance with an embodiment of the present invention.

FIG. 6 is a diagrammatic perspective view of a coaxial insertion-type magnetic flow meter in accordance with an embodiment of the present invention. FIG. 6 illustrates flexible circuit module 220 disposed within casing 318.

With the low profile of the internally-disposed coils, as well as their proximity to the process fluid, it is believed that embodiments of the present invention may be able to operate using lower power levels than previous designs.

Although the present invention has been described with reference to preferred embodiments, workers skilled in the art will recognize that changes may be made in form and detail without departing from the spirit and scope of the invention.

What is claimed is:

1. A magnetic flowmeter for sensing process fluid flow, the flowmeter comprising:
 a tube configured to receive the process fluid flow therethrough;
 a plurality of electrodes disposed to contact process fluid;
 at least one electromagnetic coil disposed proximate the tube;
 flowmeter electronics configured to drive a current through the at least one electromagnetic coil and to sense a signal developed across the plurality of electrodes;
 a flexible circuit module disposed proximate the tube, the flexible circuit module having at least one flexible circuit containing a plurality of electrical traces electrically coupled to the flowmeter electronics;
 wherein the at least one electromagnetic coil includes a first coil in the flexible circuit module that is coupled to the electrical traces; and
 wherein the flowmeter is a coaxial, insertion-type magnetic flowmeter.

2. The flowmeter of claim 1, wherein the at least one electromagnetic coil includes a second coil in the flexible circuit module coupled to the plurality of traces.

3. The flowmeter of claim 1, wherein the first coil is formed as an etched circuit trace.

4. The flowmeter of claim 1, wherein the first coil is plated onto a substrate of the flexible circuit module.

5. The flowmeter of claim 1, wherein the first coil is a wire-wound coil.

6. The flowmeter of claim 1, wherein the flexible circuit module also includes at least one of the electrodes, and wherein the at least one electrode is coupled to electrical traces separate from electrical traces coupled to the electromagnetic coil.

7. The flowmeter of claim 6, wherein the flexible circuit module includes the plurality of electrodes, and wherein each of the plurality of electrodes is coupled to electrical traces separate from the electrical traces coupled to the electromagnetic coil.

8. The flowmeter of claim 6, wherein the at least one electrode comprises a raised tip extending inward from the flexible circuit module to contact the process fluid.

9. The flowmeter of claim 1, and further comprising a substantially non-conductive liner disposed between the flexible circuit module and the process fluid except for regions proximate the electrodes.

10. The flowmeter of claim 1, wherein the tube is constructed from carbon steel.

11. The flowmeter of claim 1, wherein the tube comprises an interconnect allowing sealed passage of a plurality of conductors from the at least one electromagnetic coil and the plurality of electrodes to the flowmeter electronics.

12. The flowmeter of claim 11, wherein the plurality of conductors are wires coupled to the flexible circuit module.

13. The flowmeter of claim 11, wherein the interconnect is formed as a glass header.

14. The flowmeter of claim 1, wherein the tube is configured to be mounted at least partially within process piping.

15. The flowmeter of claim 1, wherein a leading edge of the tube has a fluid conditioning surface to condition process fluid through the tube.

16. The flowmeter of claim 15, wherein the fluid conditioning surface is a curved surface.

17. The flowmeter of claim 1, wherein the tube is coupled to an edge that is configured to be mounted between a pair of pipe flanges, the edge having a first surface for contacting the first pipe flange and a second surface for contacting the second flange, and wherein the tube is displaced downstream from the first and second pipe flanges.

18. The flowmeter of claim 17, wherein the edge is a gasketed leading edge.

19. A magnetic flowmeter for sensing process fluid flow, the flowmeter comprising:
- a tube configured to receive the process fluid flow therethrough;
- a plurality of electrodes disposed to contact process fluid;
- at least one electromagnetic coil disposed proximate the tube;
- flowmeter electronics configured to drive a current through the at least one electromagnetic coil and to sense a signal developed across the plurality of electrodes;
- a flexible circuit module disposed proximate the tube, the flexible circuit module having at least one flexible circuit containing a plurality of electrical traces electrically coupled to the flowmeter electronics;
- wherein the at least one electromagnetic coil includes a first coil in the flexible circuit module that is coupled to the electrical traces; and
- wherein the first coil is formed as an etched circuit trace.

20. The flowmeter of claim 19, wherein the at least one electromagnetic coil includes a second coil in the flexible circuit module coupled to the plurality of traces.

21. The flowmeter of claim 19, wherein the flexible circuit module also includes at least one of the electrodes, and wherein the at least one electrode is coupled to electrical traces separate from electrical traces coupled to the electromagnetic coil.

22. The flowmeter of claim 21, wherein the at least one electrode comprises a raised tip extending inward from the flexible circuit module to contact the process fluid.

23. The flowmeter of claim 19, and further comprising a substantially non-conductive liner disposed between the flexible circuit module and the process fluid except for regions proximate the electrodes.

24. The flowmeter of claim 19, wherein the tube is configured to be mounted at least partially within process piping.

25. A magnetic flowmeter for sensing process fluid flow, the flowmeter comprising:
- a tube configured to receive the process fluid flow therethrough;
- a plurality of electrodes disposed to contact process fluid;
- at least one electromagnetic coil disposed proximate the tube;
- flowmeter electronics configured to drive a current through the at least one electromagnetic coil and to sense a signal developed across the plurality of electrodes;
- a flexible circuit module disposed proximate the tube, the flexible circuit module having at least one flexible circuit containing a plurality of electrical traces electrically coupled to the flowmeter electronics;
- wherein the at least one electromagnetic coil includes a first coil in the flexible circuit module that is coupled to the electrical traces;
- wherein the flexible circuit module includes the plurality of electrodes, and wherein each of the plurality of electrodes is coupled to electrical traces separate from the electrical traces coupled to the electromagnetic coil; and
- wherein the at least one electrode comprises a raised tip extending inward from the flexible circuit module to contact the process fluid.

26. The flowmeter of claim 25, wherein the at least one electromagnetic coil includes a second coil in the flexible circuit module coupled to the plurality of traces.

27. The flowmeter of claim 25, wherein the first coil is plated onto a substrate of the flexible circuit module.

28. The flowmeter of claim 25, wherein the first coil is a wire-wound coil.

29. The flowmeter of claim 25, wherein the flexible circuit module also includes at least one of the electrodes, and wherein the at least one electrode is coupled to electrical traces separate from electrical traces coupled to the electromagnetic coil.

30. The flowmeter of claim 25, wherein the tube is configured to be mounted at least partially within process piping.

31. A magnetic flowmeter for sensing process fluid flow, the flowmeter comprising:
- a tube configured to receive the process fluid flow therethrough;
- a plurality of electrodes disposed to contact process fluid;
- at least one electromagnetic coil disposed proximate the tube;
- flowmeter electronics configured to drive a current through the at least one electromagnetic coil and to sense a signal developed across the plurality of electrodes;
- a flexible circuit module disposed proximate the tube, the flexible circuit module having at least one flexible circuit containing a plurality of electrical traces electrically coupled to the flowmeter electronics;
- wherein the at least one electromagnetic coil includes a first coil in the flexible circuit module that is coupled to the electrical traces; and
- wherein the tube comprises an interconnect allowing sealed passage of a plurality of conductors from the at least one electromagnetic coil and the plurality of electrodes to the flowmeter electronics.

32. The flowmeter of claim 31, wherein the flexible circuit module also includes at least one of the electrodes, and wherein the at least one electrode is coupled to electrical traces separate from electrical traces coupled to the electromagnetic coil.

33. The flowmeter of claim 31, and further comprising a substantially non-conductive liner disposed between the flexible circuit module and the process fluid except for regions proximate the electrodes.

34. The flowmeter of claim 31, wherein the plurality of conductors are wires coupled to the flexible circuit module.

35. The flowmeter of claim 31, wherein the interconnect is formed as a glass header.

36. A magnetic flowmeter for sensing process fluid flow, the flowmeter comprising:
- a tube configured to receive the process fluid flow therethrough;
- a plurality of electrodes disposed to contact process fluid;
- at least one electromagnetic coil disposed proximate the tube;
- flowmeter electronics configured to drive a current through the at least one electromagnetic coil and to sense a signal developed across the plurality of electrodes;
- a flexible circuit module disposed proximate the tube, the flexible circuit module having at least one flexible circuit containing a plurality of electrical traces electrically coupled to the flowmeter electronics;

wherein the at least one electromagnetic coil includes a first coil in the flexible circuit module that is coupled to the electrical traces; and wherein a leading edge of the tube has a fluid conditioning surface to condition process fluid through the tube.

37. The flowmeter of claim 36, and further comprising a substantially non-conductive liner disposed between the flexible circuit module and the process fluid except for regions proximate the electrodes.

38. The flowmeter of claim 36, wherein the tube is configured to be mounted at least partially within process piping.

39. The flowmeter of claim 36, wherein the fluid conditioning surface is a curved surface.

40. A magnetic flowmeter for sensing process fluid flow, the flowmeter comprising:
- a tube configured to receive the process fluid flow therethrough;
- a plurality of electrodes disposed to contact process fluid;
- at least one electromagnetic coil disposed proximate the tube;
- flowmeter electronics configured to drive a current through the at least one electromagnetic coil and to sense a signal developed across the plurality of electrodes;
- a flexible circuit module disposed proximate the tube, the flexible circuit module having at least one flexible circuit containing a plurality of electrical traces electrically coupled to the flowmeter electronics;
- wherein the at least one electromagnetic coil includes a first coil in the flexible circuit module that is coupled to the electrical traces; and
- wherein the tube is coupled to an edge that is configured to be mounted between a pair of pipe flanges, the edge having a first surface for contacting the first pipe flange and a second surface for contacting the second flange, and wherein the tube is displaced downstream from the first and second pipe flanges.

41. The flowmeter of claim 40, wherein the edge is a gasketed leading edge.

* * * * *